United States Patent
Tatsuura et al.

(10) Patent No.: US 7,990,602 B2
(45) Date of Patent: *Aug. 2, 2011

(54) DISPLAY MEDIUM AND DISPLAY DEVICE

(75) Inventors: Satoshi Tatsuura, Kanagawa (JP); Ryojiro Akashi, Kanagawa (JP); Naoki Hiji, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/617,290

(22) Filed: Nov. 12, 2009

(65) Prior Publication Data

US 2010/0309538 A1 Dec. 9, 2010

(30) Foreign Application Priority Data

Jun. 8, 2009 (JP) .................. 2009-137237

(51) Int. Cl.
*G02F 1/153* (2006.01)
*G02F 1/15* (2006.01)
*G09G 3/19* (2006.01)
*H04N 9/16* (2006.01)

(52) U.S. Cl. ............ 359/270; 359/265; 345/49; 348/817

(58) Field of Classification Search .......... 359/265–275, 359/277, 245–247, 254, 242; 345/49, 105; 250/70; 348/817; 438/929

See application file for complete search history.

(56) References Cited

U.S. PATENT DOCUMENTS 7,557,499 B2 * 7/2009 Reynolds .................... 313/503

2004/0201878 A1 * 10/2004 Agrawal et al. ............... 359/266
2007/0024948 A1 2/2007 Hirano et al.
2008/0013152 A1 1/2008 Hirano et al.

FOREIGN PATENT DOCUMENTS

| JP | A 07-249790 | 9/1995 |
|----|-------------|--------|
| JP | A-7-249790 | 9/1995 |
| JP | A-2003-255400 | 9/2003 |

(Continued)

OTHER PUBLICATIONS

The Preprint (2B1-15) of the Chemical Society of Japan (Annual Meeting in Spring Mar. 2009).
Front page of Nikkei Industrial Daily, Mar. 26, 2009.
Japanese Office Action dated Jul. 13, 2010 for Japanese Patent Application No. 2008-311773 (with translation).
Jul. 12, 2010 Office Action for U.S. Appl. No. 12/432,176.
Co-pending U.S. Appl. No. 12/432,176, filed Apr. 29, 2009.

*Primary Examiner* — DaWayne A Pinkney
(74) *Attorney, Agent, or Firm* — Oliff & Berridge, PLC

(57) ABSTRACT

A display medium includes: a pair of substrates; an electrode arranged between the pair of substrates and on one substrate of the pair of substrates; a multilayered structure including plural color-forming layers arranged between one substrate of the pair of substrates and the electrode, each of the plural color-forming layers containing an electroconductive sheet-like porous body and an electrochromic dye which is retained by the porous body and is reversibly colored or decolored by at least one of an electrochemical oxidation reaction or a reduction reaction, and the colors when the electrochromic dyes in the respective plural color-forming layers are colored being different from one another; and an electrolytic material included in a region between the pair of substrates.

11 Claims, 6 Drawing Sheets

FOREIGN PATENT DOCUMENTS

| | | |
|---|---|---|
| JP | A-2003-270670 | 9/2003 |
| JP | A-2004-151265 | 5/2004 |
| JP | A 2006-106669 | 4/2006 |
| JP | A-2006-113530 | 4/2006 |
| JP | A-2007-052171 | 3/2007 |
| JP | A 2007-132963 | 5/2007 |
| JP | A-2008-180999 | 8/2008 |
| JP | A-2009-181058 | 8/2009 |

* cited by examiner

DISPLAY MEDIUM AND DISPLAY DEVICE

CROSS-REFERENCE TO RELATED APPLICATION

This application claims priority under 35 USC 119 from Japanese Patent Application No. 2009-137237 filed on Jun. 8, 2009.

BACKGROUND

1. Technical Field

The present invention relates to a display medium and a display device.

2. Related Art

A display medium is known that uses an electrochromic dye which reversibly changes light absorption by an electrochemical redox reaction.

SUMMARY

According to an aspect of the invention, there is provided a display medium including:

a pair of substrates;

an electrode arranged between the pair of substrates and on one substrate of the pair of substrates;

a multilayered structure including plural color-forming layers arranged between one substrate of the pair of substrates and the electrode, each of the plural color-forming layers containing an electroconductive sheet-like porous body and an electrochromic dye which is retained by the porous body and is reversibly colored or decolored by at least one of an electrochemical oxidation reaction or a reduction reaction, and the colors when the electrochromic dyes in the respective plural color-forming layers are colored being different from one another; and an electrolytic material included in a region between the pair of substrates.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the drawings. The same denotations are assigned to the members having the same actions and functions through all the drawings, and explanations thereof may be omitted.

Figure 1:
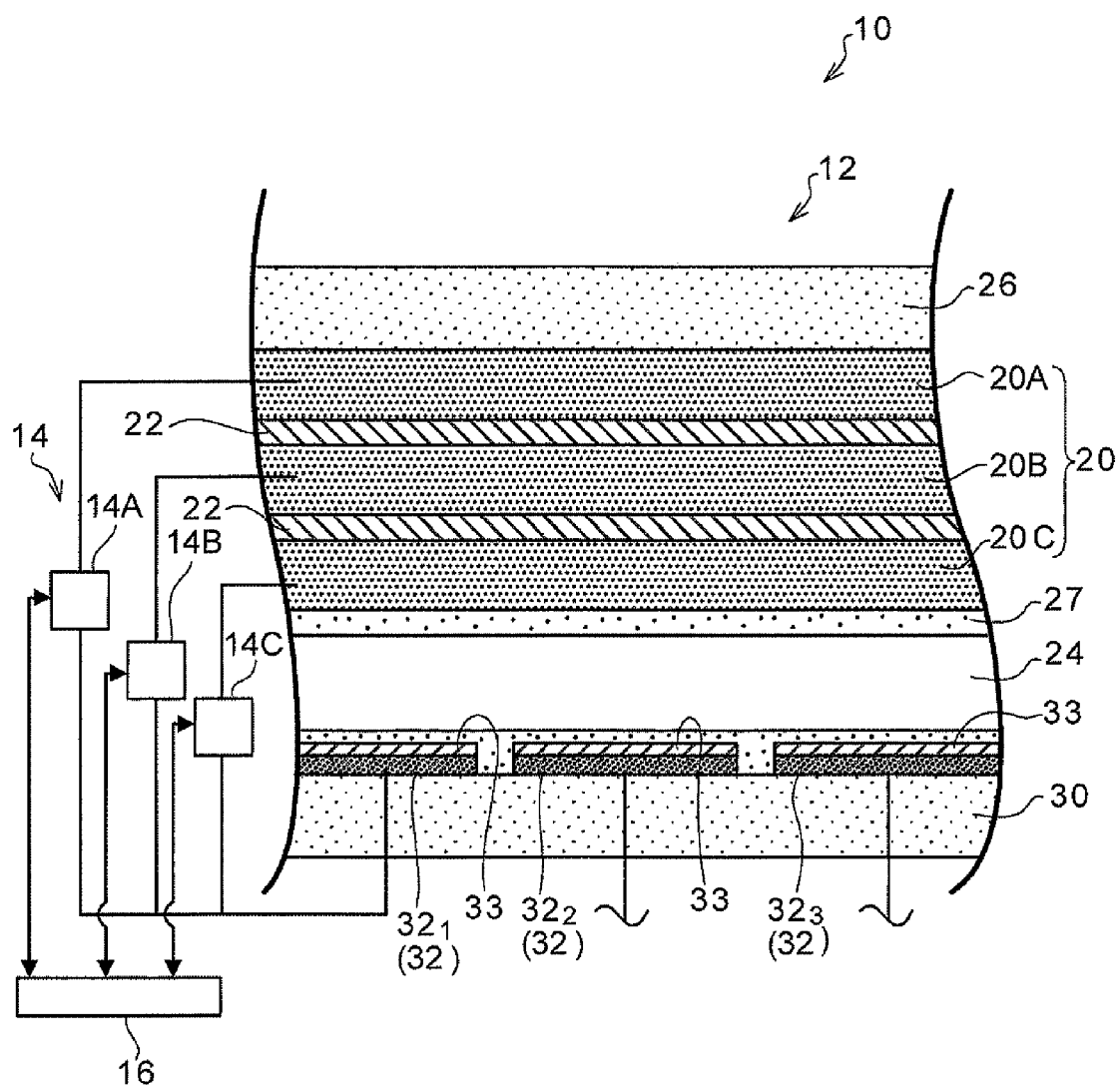
FIG. 1 is a schematic drawing showing a display device according to an exemplary embodiment of the invention.

In an exemplary embodiment of the invention, as shown in FIG. 1, a display device 10 includes a display medium 12, a voltage applying section 14 that applies voltages to the display medium 12, and a control section 16.

Display Medium

The display medium 12 includes a substrate 26 which serves as the image display surface, and a substrate 30 arranged at a distance from the display substrate 26. The region between the substrate 26 and the substrate 30 is filled with an electrolytic material 27, and a multilayered structure is formed such that an electrode 32, a reflective layer 24, a color-forming layer 20C, an insulation layer 22, a color-forming layer 20B, an insulation layer 22 and a color-forming layer 20A are superimposed in this order from the substrate 30 side toward the substrate 26 side in the thickness direction of the display medium 12. Hereinafter, when the color-forming layer 20A, the color-forming layer 20B and the color-forming layer 20C are collectively referred to, these layers are referred to as color-forming layers 20. Although the electrolytic material 27 is shown, in the figures, as if the electrolytic material 27 forms a layer, the electrolytic material 27 permeates the multilayered structure and thus does not form a layer, as also specifically described below.

Of the substrate 26, the substrate 30, the electrode 32, the reflective layer 24, the color-forming layer 20C, the insulation layer 22, the color-forming layer 20B, the insulation layer 22 and the color-forming layer 20A, all the layers other than the substrate 26, the substrate 30 and the electrode 32 are configured such that the electrolytic material 27 permeates these layers.

Here, the display 10 corresponds to the display device of the invention, and the display medium 12 corresponds to the display medium of the invention. The substrate 26 and the substrate 30 correspond to a pair of substrates of the display medium of the invention, the electrode 32 corresponds to the electrode of the display medium of the invention, and the color-forming layer 20A, the color-forming layer 20B and the color-forming layer 20C correspond to the color-forming layers of the display medium of the invention. Further, the color-forming layers 20 that collectively refer to the color-forming layer 20A, the color-forming layer 20B and the color-forming layer 20C, correspond to the multilayered structure of the display medium of the invention.

Moreover, the voltage applying section 14 corresponds to a voltage applying device of the display of the invention. The voltage applying section 14 includes a voltage applying unit 14A, a voltage applying unit 14B and a voltage applying unit 14C.

The color-forming layer 20A, the color-forming layer 20B and the color-forming layer 20C are electroconductive, and each include a sheet-like porous body and an electrochromic dye retained by the porous body. The electrochromic dye reversibly forms a colored state and decolored state as a result of at least one of an electrochemical oxidation reaction or a reduction reaction.

The electrochromic dyes retained in the porous bodies in the respective color-forming layers 20 form different colors from one another. Accordingly, by selecting the electrochromic dye contained in the respective color-forming layers of the plural color-forming layers 20, the display medium 12 can display, for example, three primary colors of yellow, magenta and cyan, and colors formed by subtractive color mixing of these three primary colors. For example, when the color-forming layer 20A contains an electrochromic dye that exhibits yellow, the color-forming layer 20B contains an electrochromic dye that exhibits magenta and the color-forming layer 20C contains an electrochromic dye that exhibits cyan, the display medium 12 having a multilayered structure formed by superimposing these color-forming layers 20 (color-forming layer 20A, color-forming layer 20B and the color-forming layer C) is capable of full color display.

In addition, the porous body corresponds to the porous body in the display medium of the invention. The threshold value of the voltage required to change the electrochromic dye retained by the porous body from a decolored state to a colored state, and the threshold value of the voltage required to change the electrochromic dye from a colored state to a decolored state can be appropriately determined in accordance with the configuration of the display medium 12 or the combination of colors to be displayed on the display medium 12, and may be the same or different for the respective color-forming layers 20.

In a conventional configuration, a color-forming layer is used in which an aggregate of semiconductive particles is used as a porous body and an electrochromic dye is retained by the aggregate of particles. In the conventional configuration, a display medium has a configuration in which the color-forming layer and a tabular electrode layer formed separately from the color-forming layer are alternately superimposed. Further, in the conventional technique, voltage is applied to the tabular electrode layer separately formed on the color-forming layer of the display medium, and electrons are transferred between the tabular electrode layer and the electrochromic dye via each particle in the particle aggregate that constitutes the porous body of the color-forming layer, whereby the electrochromic dye is colored or decolored.

However, in the conventional configuration, it is thought that failure in electrical continuity between the tabular electrode layer and each of the particles that constitute the particle aggregate (porous body) in the color-forming layer easily arises, thereby resulting in occurrence of defects in display. Further, it is thought that when cracks are formed in the porous body due to flexure or bending of the display medium, the tabular electrode layer separately formed on the porous body is also cracked, so that defects in display may arise.

Furthermore, in the conventional configuration, the display medium is prepared in such a manner that after a particle aggregate is formed by packing plural particles on a substrate, an electrochromic dye was retained by the particle aggregate, thereby forming a color-forming layer, and an electrode layer is formed by vapor deposition or the like on the thus-formed color-forming layer, and these processes are repeated, thereby producing a display device. Accordingly, there are cases where the electrochromic dye is destroyed at the time of forming the electrode layer, or the types of the electrochromic dye to be used are restricted in order to avoid the destruction. Similarly, in the processes of manufacturing the display medium, there is a case where when the layers are formed on a substrate in sequence, choice of materials or conditions to be used for manufacturing a layer at the upper layer side is limited in order to prevent the layer which has been already formed at the lower layer side from sustaining damage.

In contrast, it has been found that in the invention, each of plural color-forming layers 20 formed in the display medium 12 contains an electroconductive sheet-like porous body and an electrochromic dye retained by the porous body, thereby suppressing defects in display even when external force is applied to the display medium.

That is, in the display medium 12 in the exemplary embodiment of the invention, the electrochromic dye is electroconductive and is retained by the sheet-like porous body. Accordingly, a voltage which is to be applied to the display medium 12 to form a color is applied directly to the electroconductive porous body of the display medium 12, and electrons are given to and received by the electrochromic dye via the electroconductive porous body. In this way, the electrochromic dye in each of the color-forming layers 20 is colored or decolored. Thus, since the porous body itself is electroconductive, even when force such as flexure or bending is applied to the display medium 12, phenomena such as failure in electrical continuity between the tabular electrode layer and each of the particles that constitute the particle aggregate (porous body) in the conventional configuration do not arise, and in the present invention, defects in display can be prevented even when force is applied to the display medium from the outside.

Further, in the display medium 12 in the exemplary embodiment of the invention, since the porous body is sheet-like, the porous body is handled as a single sheet member. Accordingly, the color-forming layer in which the electrochromic dye is retained by the sheet-like porous body is handled as a single independent member, and deterioration or damage of each layer at the time of manufacturing of the display medium 12 dissimilarly from the conventional configuration may be suppressed and defects in display may be suppressed.

The "sheet-like" member in the exemplary embodiment of the invention means a cloth-like or film-like member which can be handled as a single independent member.

Hereinafter, each component of the display medium 12 in the exemplary embodiment of the invention is explained in detail.

Substrate and Electrode

Of the substrate 26 and the substrate 30, the substrate formed at least display surface side of the display medium 12 is transparent. Here, the transparency in the exemplary embodiment of the invention means that the average transmittance of visible light is 80% or more.

The constituent materials, size, thickness and the like of the substrate 26 and the substrate 30 can be appropriately selected in accordance the intended use or the like of the display medium 12. Suitable examples of the substrate 26 and the substrate 30 include a glass plate and a polymer film. Examples of materials of the polymer film include tetraacetyl cellulose (TAC), polyethylene terephthalate (PET), polyethylene naphthalate (PEN), syndiotactic polystyrene (SPS), polyphenylene sulfide (PPS), polycarbonate (PC), polyarylate (PAr), polysulfone (PSF), polyester sulfone (PES), polyether imide (PEI), cyclic polyolefin and bromated phenoxy.

In the display medium 12 in the exemplary embodiment of the invention, the electrode 32 may be arranged between the substrate 26 and the substrate 30 and either on the substrate 26 or the substrate 30. In the exemplary embodiment of the invention, the explanation is made as the electrode 32 is arranged on the substrate 30 as shown in FIG. 1.

The electrode 32 may be continuously formed in a layer over the entire region of the surface of the substrate 30 facing the substrate 26, or plural electrodes 32 may be formed in a configuration where plural numbers of electrodes 32 are arranged separately at intervals on the surface of the substrate 30 facing the substrate 26.

When a configuration where plural number of electrode 32 are arranged separately at intervals on the surface of the substrate 30 facing the substrate 26 is used, for example, as shown in FIG. 1, the electrodes 32 (electrode $32_1$, electrode $32_2$ and electrode $32_3$ in FIG. 1) may be arranged for each region corresponding to each pixel when an image is displayed on the display medium 12. When the electrodes 32 are arranged for each region corresponding to each pixel, voltages are selectively applied to each electrode 32 and to any of the porous bodies of the plural color-forming layers 20, so that the regions corresponding to each pixel of the color-forming layer 20, to which the voltages are applied, are selectively colored.

The electrodes 32 (electrode $32_1$, electrode $32_2$ and electrode $32_3$) are not specifically restricted as long as the electrodes 32 are electroconductive. Here, in the exemplary embodiment as shown in FIG. 1, since the electrodes 32 are not arranged at the display surface side, but are arranged on the substrate 30 at the back surface side, the electrodes 32 are not necessarily transparent. However, when the electrodes 32 are arranged on the substrate 26 which serves as the display surface, it is necessary that the electrodes 32 be transparent.

Materials for the electrodes 32 can be appropriately selected in accordance with the intended use, and the electrodes 32 may each be, for example, an electroconductive polymer layer, a carbon layer, a metal layer formed from copper, aluminum, platinum, gold, silver, rhodium, chromium, nickel or the like, in addition to the layer of a metal oxide such as indium tin oxide (ITO), tin oxide (NESA), fluorine-doped tin oxide (FTO), indium oxide or zinc oxide.

Here, in the exemplary embodiment of the invention, the terms "electroconductivity" and "electroconductive" mean that the volume resistivity is less than equal to or about $10^2$ Ω·cm. Further, in the following descriptions, the terms "semiconductivity" and "semiconductive" mean that the volume resistivity is from $10^2$ Ω·cm to $10^5$ Ω·cm. Furthermore, the term "insulation" or "insulating" means that the volume resistivity is $10^9$ Ω·cm or more.

The thickness of the electrode 32 is not specifically restricted, but, for example, is 0.1 μm to 20 μm.

Color-forming Layer

The color-forming layer 20A, the color-forming layer 20B and the color-forming layer 20C, each contain an electroconductive sheet-like porous body and an electrochromic dye retained by the electroconductive porous body.

The porous body is electroconductive, and has a sheet-like form having pores therein that communicate with the outside. The electroconductive sheet-like porous body is not specifically restricted as long as the porous body is electroconductive and sheet-like, and retains an electrochromic dye in the inside of the porous body, and the electroconductive material 27 is permeable into the porous body.

The size of the pores of the porous body is not specifically restricted as long as the pores of the porous body have a size that the electrochromic dye can permeate the porous body through the pores and is retained in the porous body at the time of manufacturing the color-forming layer 20.

The porous body is transparent in a state where the electrochromic dye retained by the porous body is decolored. In order to render the porous body transparent, for example, the porosity or constituent component of the porous body is adjusted. For example, the porosity of the porous body is preferably from 60% to 90%.

Here, that the porous body is transparent is more specifically that the light transmittance is 50% or more, when the transmitted light intensity in the visible light wavelength range (in the range of 400 nm to 700 nm) is set to $T_a$ in a state where only the electrolytic material 27 fills the region between the substrate 26 and the substrate 30, and the transmitted light intensity in the visible light wavelength range is set to $T_2$ in a state where the electrolytic material 27 fills the region between the substrate 26 and the substrate 30 to immerse the porous body to be measured in the electrolytic material 27 (in other words, the electrolytic material 27 is retained in the pores of the porous body). In addition, the light transmittance is preferably 70% or more, and is more preferably 90% or more. Here, the light transmittance is measured by the use of USB 2000 ((trade name) manufactured by Ocean Optics Inc.).

$$\text{Light transmittance} = T_2/T_1 \times 100 (\%)$$

The thickness (thickness of each color-forming layer 20) of the porous body, for example, is from equal to or about 1 μm to equal to or about 100 μm, is preferably from equal to or about 5 μm to equal to or about 50 μm, and is more preferably from equal to or about 5 μm to equal to or about 20 μm.

The specific surface area of the porous body is preferably from equal to or about 1 m²/g to equal to or about 5,000 m²/g, and more preferably from equal to or about 10 m²/g to equal to or about 2,500 m²/g. Here, the specific surface area means the BET specific surface area determined by the amount of adsorption of nitrogen gas. The quantity of the electrochromic dye to be retained in the porous body can be adjusted by adjusting the specific surface area of the porous body.

The porous body may be any constitution as long as the porous body has a electroconductivity, has a sheet-like form and retains the electrochromic dye in the inside of the porous body, and allows permeation of the electroconductive material 27 into the porous body. More specifically, a constitution in which the porous body is formed of the aggregate of electroconductive fibers, a constitution in which the porous body is formed of the aggregate of electroconductive fiber and electroconductive or semiconductive particles retained by the aggregate of electroconductive fibers, or the like may be exemplified.

The aggregate of electroconductive fibers may be a bulky shape formed by simply bundling electroconductive fibers together, an aggregate formed by arranging electroconductive fibers with high density, an aggregate in a mesh form prepared by knitting threads of electroconductive fibers or in a woven form prepared by weaving threads of electroconductive fibers, an aggregate in a nonwoven form in which a portion of the fibers are fused or intertwined, or an aggregate in a web form.

Specifically, examples of the aggregate of electroconductive fibers include a nonwoven fabric, a polymer film, cloth and paper. Among them, nonwoven fabric is desirable, because the diameter of fiber and the distance among fibers can be independently designed.

Examples of the electroconductive fibers that constitute the aggregate of the electroconductive fibers include electroconductive fibers, in which the surface of the fibers formed from polyethylene, polystyrene, polyester, polyacrylate, polypropylene, fluorinated resins such as polytetrafluoroethylene (PTFE) or the like is subjected to a charging treatment such as a corona discharge treatment, and the electroconductive fibers of which surface is covered with an electroconductive material. The electroconductive material may be appropriately selected in accordance with the constituent materials or the like of the fibrous members to be covered.

The diameter of the fibers that constitute the aggregate of electroconductive fibers is in the range of from 0.1 μm to 20 μm, and is preferably in the range of from 0.1 μm to 3 μm. Further, the density of the aggregate of conductive fibers may be controlled from the viewpoint that the transparency of the porous body as the aggregate of fibers is not impaired, and the electrochromic dye can be retained by the porous body. For example, the basis weight of fibers of the aggregate is in the range of from 10 g/m² to 70 g/m², and is more preferably in the range of from 20 g/m² to 50 g/m².

In the display medium 12 of the exemplary embodiment of the invention, the aggregate of the electroconductive fibers may be used as the porous body, but it is preferable that the porous body include the aggregate of the electroconductive fibers and the electroconductive or semiconductive particles retained by the aggregate of the electroconductive fibers.

This is because when the porous body includes the aggregate of the electroconductive fibers and the electroconductive or semiconductive particles retained by the aggregate of the electroconductive fibers, the specific surface area of the porous body is large and the electrochromic dye is easily retained in the porous body, as compared with the case where only the aggregate of electroconductive fibers are used as a porous body. Further, such a constitution in which the electroconductive or semiconductive particles are retained by the aggregate of the electroconductive fibers is preferable from the viewpoint that the specific surface area of the porous body be easily adjusted by controlling the size or quantity of the particles to be retained.

Moreover, when the porous body includes the aggregate of the electroconductive fibers and the electroconductive or semiconductive particles retained by the aggregate of the fibers, the contact area between the electroconductive fibers, to which voltages are applied, and the electroconductive or semiconductive particles retained by the aggregate of the electroconductive fibers is large, as compared with the contact area between a tabular electrode layer, to which voltages are applied, and each of the particles that constitute the aggregate of semiconductive particles in the conventional method. Accordingly, electrons may be effectively given to and received by the electrochromic dye retained by the porous body, so that defects in display may be suppressed.

Here, the state where the particles are "retained by the aggregate of the electroconductive fibers" means the state where the electroconductive or semiconductive particles are retained in contact with the surface of the fibers that constitute the aggregate of electroconductive fibers. More specifically, the electroconductive or semiconductive particles are placed in gaps (among the fibers) in the aggregate of electroconductive fibers or on the surface of the aggregate of electroconductive fibers, so that the electroconductive or semiconductive particles are retained in contact with the fibers that constitute the aggregate of electroconductive fibers.

Figure 2A:
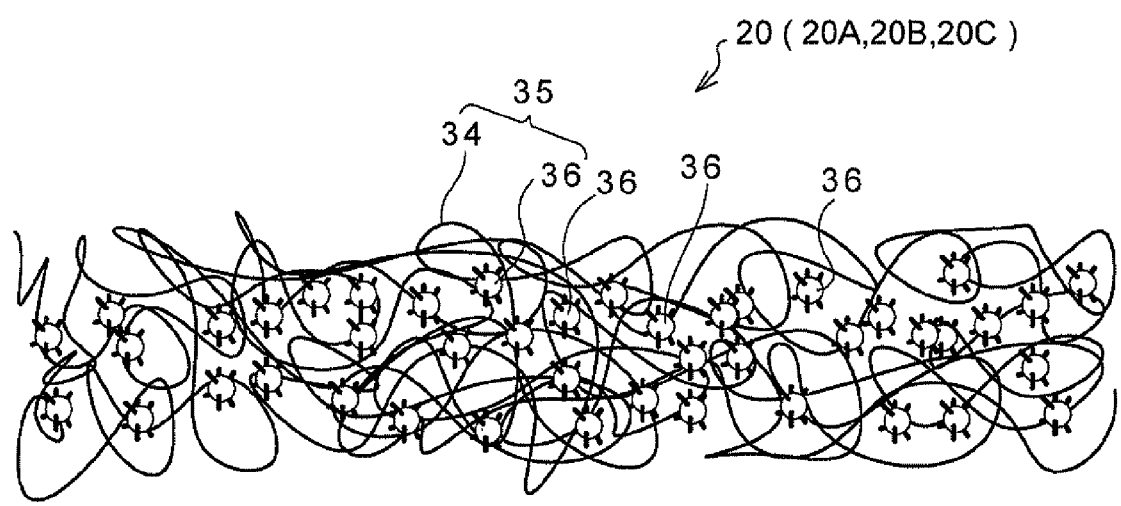
FIG. 2A is a schematic cross-sectional drawing with an enlarged color-forming layer.
Figure 2B:
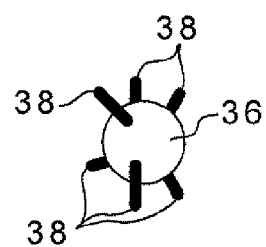
FIG. 2B is a schematic drawing showing particles retained by an aggregate of fibers in a color-forming layer, and electrochromic dye retained by the particles.

When the porous body includes the aggregate of the electroconductive fibers and the electroconductive or semiconductive particles retained by the aggregate of the electroconductive fibers, more concretely, as shown in FIG. 2A, the porous body 35 of the color-forming layer 20 may be formed of the aggregate 34 of fibers and the particles 36 retained by the aggregate 34 of fibers. When a color-forming layer 20 is formed, the constitution, in which the electrochromic dye 38 is retained on the surface of the particles 36 retained by the aggregate 34 of the fibers, may be formed (FIG. 2B). The method of retaining the electrochromic dye will be explained below.

Further, in the embodiments as shown in FIGS. 2A and 2B, the state where the electrochromic dye 38 is retained only on the surface of particles 36 is illustrated; however, the electrochromic dye 38 may also be retained on the surface of the fibers of the aggregate 34 of fibers in addition to the surface of the particles 36.

The particles 36 retained by the aggregate 34 of the electroconductive fibers are electroconductive or semiconductive, and are retained by the fibers in a state where the particles 36 are present in the gaps (pores formed among the fibers adjacent to one another) in the aggregate 34 of the fibers, and may be any particles 36 that realize a state where the "porous body is transparent" as described in the above, when the porous body 35 is formed with the use of the particles 36.

Examples of the conductive particles 36 include particles of a single element semiconductor, an oxide semiconductor, a compound semiconductor, an organic semiconductor, a composite oxide semiconductor and the mixture thereof, and may contain impurities as a dopant. In addition, the morphology of the crystal of the semiconductors is not specifically restricted, but may be monocrystalline, polycrystalline or amorphous, or the mixture thereof.

Examples of the single element semiconductor include silicon (Si), germanium (Ge) and tellurium (Te).

The oxide semiconductor is a metal oxide having characteristics as a semiconductor. Examples of the oxide semiconductors include $TiO_2$, $SnO_2$, $Fe_2O_3$, $SrTiO_3$, $WO_3$, ZnO, $ZrO_2$, $Ta_2O_5$, $Nb_2O_5$, $V_2O_5$, $In_2O_3$, CdO, MnO, CoO, $TiSrO_3$, $KTiO_3$, $Cu_2O$, sodium titanate, barium titanate and potassium niobate.

Examples of the compound semiconductors include sulfide of cadmium, sulfide of zinc, sulfide of lead, sulfide of silver, sulfide of antimony, sulfide of bismuth, selenide of cadmium, selenide of lead, telluride of cadmium, phosphide of zinc, phosphide of gallium, phosphide of indium, phosphide of cadmium, selenide of gallium-arsenic, selenide of copper-indium and sulfide of copper-indium.

Examples of the organic semiconductors include polythiophene, polypyrrole, oxyacetylene, polyphenylene vinylene and polyphenylene sulfide.

Examples of the composite oxide semiconductors include $SnO_2$—ZnO, $Nb_2O_5$—$SrTiO_3$, $Nb_2O_5$—$Ta_2O_5$, $Nb_2O_5$—$ZrO_2$, $Nb_2O_5$—$TiO_2$, Ti—$SnO_2$, Zr—$SnO_2$, Bi—$SnO_2$, In—$SnO_2$, Al—ZnO and Ga—ZnO. $SnO_2$—ZnO is formed by covering the periphery of ZnO particles as the core having a relatively large size (particle diameter of about 0.2 μm) with $SnO_2$ superparticles (particle diameter of about 15 nm), and the ratio of the both components in the composite, for example, $SnO_2$: ZnO is desirably from 70:30 to 30:70 by weight ratio. $Nb_2O_5$ composites such as $Nb_2O_5$—$SrTiO_3$, $Nb_2O_5$—$Ta_2O_5$, $Nb_2O_5$—$ZrO_2$ or $Nb_2O_5$—$TiO_2$, are composited with $Nb_2O_5$ at a ratio of from 8:2 to 2:8 by weight ratio.

The shape of the semiconductor particles is not specifically restricted, but may be appropriately selected in accordance with the intended use, and may be any of spherical, nanotubed, rod-shaped and whisker-shaped particles, and a mixture of two or more kinds of particles having different shapes may be used. In the case of the spherical particles, the number average particle diameter is in the range of from 0.1 nm to 200 nm, and preferably in the range of from 1 nm to 50 nm. Two or more kinds of particles having different particle diameter distribution may be mixed. Further, in the case of the rod-shaped particles, the particles may have an aspect ratio of from 2 to 50,000, and preferably from 5 to 25,000.

In addition, the quantity of the particles 36 to be retained by the aggregate 34 of fibers may be such a quantity that the electrolytic material 27 can easily permeate the aggregate 34. The quantity of the particles 36 retained by the aggregate 34 of fibers can be adjusted by adjusting the quantity of dropping of the particles 36 per unit area, the density of the aggregate 34 of fibers, the porosity, the average pore diameter or the like.

Electrochromic Dye

The electrochromic dye is a dye that is reversibly colored or decolored owing to at least one of an electrochemical oxidation reaction and an electrochemical reduction reaction. In the display medium 12 in the exemplary embodiment of the invention, at least two kinds of electrochromic dyes that exhibit colors different from each other are contained in each of the color-forming layers 20, respectively. The electrochromic dye used in the display medium 12 in the exemplary embodiment of the invention may be any of oxidation dyes and reduction dyes.

The oxidation dye is an electrochromic dye that is decolored owing to an electrochemical reduction reaction that forms a decolored state, and is colored owing to an oxidation reaction that forms a colored state. The reduction dye is an electrochromic dye that is decolored owing to an electrochemical oxidation reaction that forms a decolored state, and is colored owing to a reduction reaction that forms a colored state.

The "colored state" refers to a state in which a color is formed, and the electrochromic dye exhibits at least a state in which an absorption peak is present in the visible light region, and which is visually perceived as a colored state. Further, the "decolored state" refers to a state in which a color is faded, and the electrochromic dye exhibits at least a state in which an absorption peak is present outside the visible light region, and which is visually observed as a colorless state or a decolored state with faint color.

The electrochromic dye contained in each color-forming layer 20 is changed from a decolored state to a colored state or from a colored state to a decolored state by applying voltages to the electrode 32 and the electroconductive porous body in each color-forming layer 20.

The electrochromic dyes used in the display medium 12 in the present exemplary embodiment of the invention are not specifically restricted as long as the dyes function such that the dyes are colored or are decolored due to at least one of the electrochemical oxidation reaction and the electrochemical reduction reaction, and the dyes can be appropriately selected in accordance with the intended use. For example, organic compounds, metal complexes and the like are preferably exemplified. These compounds may be used singly, or two or more kinds may be used in combination.

Examples of the metal complexes include Prussian blue, a metal-bipyridyl complex, a metal phenanthroline complex, a metal-phthalocyanine complex, a metal ferricyanide and the derivatives thereof. Examples of the organic compounds include (1) pyridine compounds, (2) electroconductive polymers, (3) styryl compounds, (4) donor/acceptor compounds and (5) other organic dyes.

Examples of the above (1) pyridine compounds include viologens, heptyl viologens (such as diheptyl viologen dibromide), methylene bispyridinium, phenanthroline, azobipyridinium, 2,2-biprydinium complex, quinoline, and isoquinoline.

Examples of the above (2) electroconductive polymers include polypyrrole, polythiophene, polyaniline, polyphenylene diamine, polyaminophenol, polyvinyl carbazole, polymer viologen polyion complex, and the derivatives thereof.

Examples of the above (3) styryl compounds include 2-[2-[4-(dimethylamino)phenyl]ethenyl]-3,3-dimethylindolino[2,1-b]oxazolizine, 2-[4-[4-(dimethylamino)phenyl]-1,3-butadienyl]-3,3-dimethylindolino[2,1-b]oxazolizine, 2-[2-[4-(dimethylamino)phenyl]ethenyl]-3,3-dimethyl-5-methylsulfonylindolino[2,1-b]oxazolizine, 2-[4-[4-(dimethylamino)phenyl]-1,3-butadienyl]-3,3-dimethyl-5-sulfonylindolino[2,1-b]oxazolizine, 3,3-dimethyl-2-[2-(9-ethyl-3-carbazolyl)ethenyl]indolino[2,1-b]oxazolizine and 2-[2-[4-(acetylamino)phenyl]ethenyl]-3,3-dimethylindolino[2,1-b]oxazolizine.

Examples of the above (4) donor/acceptor compounds include tetracyanoquinodimethane and tetrathiafulvalene.

Examples of the above (5) other organic dyes include phthalic acid, carbazole, methoxybiphenyl, anthraquinone, quinone, diphenylamine, aminophenol, tris-aminophenylamine, phenylacetylene, a cyclopentyl compound, a benzodithiolium compound, a squarylium salt, a cyanine, a rare earth phthalocyanine complex, ruthenium diphthalocyanine, a merocyanine, a phenanthroline complex, pyrazoline, a redox indicator, a pH indicator, and the derivatives thereof.

In the display medium 12 in the present exemplary embodiment of the invention, as the electrochromic dye, at least one of the reduction color-forming dye that exhibits a colorless or decolored state with faint color in the oxidized state and exhibits a colored state in the reduced state, and the oxidation color-forming dye that exhibits a colorless or decolored state with faint color in the reduced state and exhibits a colored state in the oxidized state, may be used. These dyes may be selected in accordance with the intended use.

Furthermore, a multicolor-forming dye which, in the colored state, exhibits several kinds of colors according to the degree of reduction or oxidation thereof may be used, and may be selected in accordance with the intended use.

As described above, the electrochromic dye is retained in the porous body. The "retained" means the state where the electrochromic dye is retained on the surface and in the pores of the porous body.

Specifically, when the porous body is formed of an aggregate of electroconductive fibers, the "retained" means the state where electrochromic dye is retained on the surface of the electroconductive fibers that constitute the aggregate. Further, when the porous body is formed of an aggregate of electroconductive fibers and particles retained by the fibers, the "retained" means the state where electrochromic dye is retained on at least one of the surface of the particles and the surface of the fibers that constitute the aggregate of fibers. In addition, when the porous body is formed of an aggregate of electroconductive fibers and particles retained by the fibers, it is desirable that the electrochromic dye be retained on the surface of at least the particles (particles retained by the aggregate of fibers) of the particles which are retained by the fibers that constitute the aggregate of fibers and are retained among the fibers, from the viewpoint of the ease of retaining the electrochromic dye.

As methods of retaining the electrochromic dye in the porous body, conventionally known techniques such as a method of adsorbing the electrochromic dye to the surface of the porous body, or a method of chemically bonding the electrochromic dye to the porous body may be applicable.

For example, the methods including a dry process such as a vacuum deposition method, a coating method such as spin coating, an electrodeposition method, an electropolymerization method or a natural adsorption process in which the porous body is immersed in a solution containing a compound to be retained, may be appropriately selected. Among these methods, the natural adsorption process is advantageous in view that the electrochromic dyes can be surely retained in the pores in the porous body to every corner uniformly, and specific devices are not required.

As the natural adsorption process, a method of immersing a well dried porous body (such as a substrate with an aggregate of particles, an aggregate of fibers or an aggregate of fibers retaining particles therein) into a solution of an electrochromic dye to be retained, or a method of applying a solution of an electrochromic dye to be retained by coating onto the porous body, can be used. In the former case, an immersing method, a dip method, a roller method and/or an air knife method may be used. In the case of the immersing method, a dye may be adsorbed at room temperature, or with heating under reflux as recited in JP-A No. 7-249790. Moreover, examples of the latter coating method include a wire bar method, a slide hopper method, an extrusion method, a curtain method, a spin method and a spray method.

Examples of the solvents for dissolving the electrochromic dye used for the solution of the electrochromic dye include water and alcohols (methanol, ethanol, t-butanol, benzyl alcohol and the like), nitriles (acetonitrile, propionitrile, 3-methoxypropionitrile and the like), nitromethane, halogenated hydrocarbons (dichloromethane, dichloroethane, chloroform, chlorobenzene and the like), ethers (diethyl ether, tetrahydrofuran and the like), dimethyl sulfoxide, amides (N,N-dimethylformamide, N,N-dimethylacetamide and the like), N-methylpyrrolidone, 1,3-dimethylimidazolizinone, 3-methyloxazolizinone, esters (ethyl acetate, butyl acetate and the like), carbonates (diethyl carbonate, ethylene carbonate, propylene carbonate and the like), ketones (acetone, 2-butanone, cyclohexanone and the like), hydrocarbons (hexane, petroleum ether, benzene, toluene and the like), and the mixed solvents thereof.

As the method of chemically bonding the electrochromic dye to the porous body, the skeleton of the electrochemical dye may be chemically bonded to the surface (in the case of an aggregate of fibers, the surface of the fibers, and in a case where an aggregate of fibers and particles retained by the fibers, the surface of the particles and the surface of the fibers) of the porous body via a functional group such as a carboxyl group. As the functional groups, for example, functional groups such as an alkyl group, a phenyl group, a carboxyl group, an ester group or an amide group are suitable. Moreover, after the surface of the porous body is modified with a silane coupling agent or the like, the electrochemical dye may be chemically bonded to the modified surface.

For example, the amount of adsorption of the electrochromic dye to the porous body may be from 0.01 mmol to 100 mmol per unit surface area (1 m$^2$) of the porous body.

Electrolytic Material

The electrolytic material 27 may be any of a liquid form and a gel form.

When the electrolytic material 27 is a liquid, a solution, in which an electrolyte such as a charge transport material or the like is dissolved, is exemplified.

Examples of the electrolytes include perchlorates such as lithium perchlorate, sodium perchlorate, calcium perchlorate or tetrabutyl ammonium perchlorate; iodine, bromine; metal halides such as LiI, NaI, KI, CsI, CaI$_2$, LiBr, NaBr, KBr, CsBr or CaBr$_2$; halides of ammonium compounds such as tetraethylammonium iodide, tetrapropylammonium iodide, tetrabutylammonium iodide, tetramethylammonium bromide, tetraethylammonium bromide or tetrabutylammonium bromide; alkyl viologens such as methyl viologen chloride or hexyl viologen bromide; polyhydroxy benzenes such as hydroquinone or naphthohydroquinone; and iron complexes such as ferrocene or ferrocyanide; and at least one of these electrolytes is used, but is not limited thereto. Further, when plural electrolytes such as a combination of iodine and lithium iodide, which generate a redox pair (oxidation-reduction pair), are mixed beforehand and used, the performance, in particular, current characteristics of the display medium 12 may be improved. Among them, a combination of iodine and an ammonium compound, and a combination of iodine and metal iodide may be suitably exemplified.

Examples of solvents for dissolving these electrolytes include carbonate compounds such as ethylene carbonate or propylene carbonate; ethers such as dioxane, diethyl ether or ethyleneglycol dialkylether; alcohols such as methanol, ethanol, isopropyl alcohol, ethylene glycol, propylene glycol or polyethylene glycol; nitriles such as acetonitrile or benzonitrile; aprotic polar solvents such as dimethylformamide, dimethyl sulfoxide, N-methylpyrrolidone, propylene carbonate or ethylene carbonate; and water, but are not limited thereto.

The concentration of the electrolyte in the solvents is preferably from equal to or about 0.001 mol/l to equal to or about 2 mol/l, and is more preferably from equal to or about 0.01 mol/l to equal to or about 1 mol/l. When the concentration of the electrolyte is less than 0.001 mol/l, the performance may be deteriorated due to insufficient function of the electrolyte as a carrier. On the other hand, when the concentration of the electrolyte exceeds 2 mol/l, the effect in proportion to the concentration may not be exerted, and the viscosity of the electrolytic solution may become higher, and this may result in reduction in current.

When the electrolytic material 27 is a gel form, gelation is caused by adding a polymer or an oil gelling agent, or gelation is caused by mixing a polyfunctional monomers with the electrolyte and the solvent. When the gelation is caused by adding a polymer, the compounds as recited in "Polymer Electrolyte Reviews-1 and 2" (co-edited by J. R. MacCallum and C. A. Vincent, ELSEVIER APPLIED SCIENCE), may be used, and in particular, polyacrylonitrile and polyvinylidene fluoride are suitable. When the gelation is caused by adding the oil gelling agent, the compounds as recited in "J. Chem. Soc. Japan, Ind. Chem. Sec., 46, 779 (1943)", "J. Am. Chem. Soc., 111, 5542 (1989)", "J. Chem. Soc., Chem. Commun., 1993, 390", "Angew. Chem. Int. Ed. Engl., 35, 1949 (1996)", "Chem. Lett., 1996, 885" and "J. Chem. Soc., Chem. Commun., 1997, 545" may be used, and in particular, compounds having an amide structure in the molecular structure are desirable.

Redox Agent

It is preferable that a redox agent, which does not form a color due to a redox reaction (namely, non-color-forming), be dispersed in the electrolytic material 27.

With the use of the redox agent, the redox reaction of the electrochromic dye arranged between the substrates proceeds efficiently, and the reversible color-forming efficiency and decoloring efficiency of the electrochromic dye can be improved.

Further, the redox agent is desirably fixed onto the electrode 32, so that the redox reaction can take place efficiently at the same time both on the electrode 32 and in the color-forming layer 20, thereby increasing the color-forming efficiency and the decoloring efficiency of the display medium 12 as a whole.

Such a redox agent may be any redox agent as long as color is not formed due to the redox reaction, and specific examples of the redox agent include ferrocene, phenothiazine, benzoquinone and the combination of iodine and metal iodide. In particular, ferrocene is desirable from the viewpoint of a high stability and a low light absorption coefficient of the solution.

As a method of fixing the redox agent to the surface of the electrode 32, the redox agent can be retained on the electrode 32 in a manner similar to the method of retaining the electrochromic dye to the porous body as described in the above.

The redox agent to be added to the electrolytic material 27 is contained in a dissolved state or dispersed state in the electrolytic material 27, and the concentration of the redox agent in the electrolytic material 27 is preferably from 0.001 mol/l to 2 mol/l, and is more preferably from 0.01 mol/l to 1 mol/l.

In addition, the electrolytic material 27 may contain a stabilizer. As the stabilizer, a metal complex is used, and specific examples thereof include triphenylantimony, triphenylarsine, and triphenyl bismuth.

Insulation Layer

Insulation layers 22 are arranged among the plural color-forming layers 20 formed in the display medium 12, and are layers with transparency and insulating property. The insulation layers 22 are arranged in order to prevent the electric continuity between adjacent electroconductive porous bodies in the color-forming layers 20 due to coming into direct contact with each other.

In the example shown in FIG. 1, the insulation layers 22 are arranged between the color-forming layer 20A and the color-forming layer 20B, and between the color-forming layer 20B and the color-forming layer 20C, respectively.

Here, as described above, the electrolytic material 27 is permeable into each layer other than the substrate 26, substrate 30 and the electrode 32 formed between the substrate 26 and the substrate 30. Accordingly, it is necessary that the electrolytic material 27 be permeable in the insulation layers 22.

Further, the insulation layers 22 are transparent. That the insulation layers 22 are transparent means, similarly to the porous body, that the light transmittance is 50% or more, when the transmitted light intensity in the visible light wavelength range (in the range of 400 nm to 700 nm) is set to $T_1$ in a state where only the electrolytic material 27 fills the region between the substrate 26 and the substrate 30 of the display medium 12, and the transmitted light intensity in the visible light wavelength range is set to $T_2$ in a state where the electrolytic material 27 fills the region between the substrate 26 and the substrate 30 of the display medium 12 to immerse the insulation layers 22 to be measured in the electrolytic material 27 (i.e., in a state where the insulation layers 22 are impregnated with the electrolytic material 27).

Light transmittance=$T_2/T_1 \times 100 (\%)$

The insulation layers 22 are not specifically restricted as long as the insulation layers have the above characteristics, but may be an aggregate of particulate members including inorganic material particles formed from titanium oxide, zinc oxide or the like, or an aggregate of particulate members including organic material particles formed from insulating materials such as methyl methacrylate resin, styrene acrylate resin, silicone resin, polytetrafluoroethylene resin or polyimide resin. Further, a resin sheet formed from these resins, or nonwoven fabric may be used. Among them, from the viewpoint of the ease of manufacture, a resin sheet or nonwoven fabric having a cloth-like structure is suitably used.

Reflective Layer

The reflective layer 24 is arranged between the substrate 26 and the substrate 30, and more specifically, is arranged between the multilayered structure formed of plural color-forming layers 20 and the substrate 30 opposite to the substrate 26 as the display surface in the display medium 12.

The reflective layer 24 has an optical reflective property which is different from the color of the colored state of the electrochromic dye which is present in the display medium 12. The color of the colored state of the electrochromic dye in each of the plural color-forming layers 20 means the color in the colored state where the plural kinds of the electrochromic dyes that respectively form different colors, and a combined color (color by subtractive color mixing) in a state where plural electrochromic dyes form colors.

Further, the electrolytic material 27 is also permeable into the reflective layer 24.

In addition, that the reflective layer 24 has "an optical reflective property which is different from the color of the colored state of the electrochromic dye" means that the colors in a state where the electrochromic dyes enclosed in the display medium 12 are visually observed in comparison with the color of the reflective layer 24, and the difference between the colors in the colored state of the electrochromic dyes and the reflective layer 24 can be distinguishable in color hue, lightness and sharpness.

It is desirable that the reflective layer 24 have a function for shielding the color at substrate 30 side (color at the opposite side of the reflective layer 24 from the color-forming layer 20) from the reflective layer 24. Here, "shielding" in the present exemplary embodiment in the invention means the case where the light transmittance to the visible light is 50% or less.

The color of the reflective layer 24 is desirably white from the viewpoint that the display can be made with a white background. More specifically, the whiteness degree is preferably 30% or more, and is more preferably 40% or more. The whiteness degree refers to a measure of whiteness, and more specifically a value measured by a Hunter-type whiteness meter or an X-rite colorimeter in accordance with the method as recited in a known method of testing brightness of paper and pulp (JIS-P8123).

The constitution of the reflective layer 24 is not specifically limited as long as the reflective layer 24 has the above characteristics, but may be an aggregate of particulate members including inorganic material particles formed from titanium oxide, zinc oxide or the like, or an aggregate of particulate members including organic material particles formed from materials such as methyl methacrylate resin, styrene acrylate resin, silicone resin or polytetrafluoroethylene resin, or these particles may be dispersed in the reflective layer 24. Further, a resin sheet or nonwoven fabric of these materials may be used. Among them, from the viewpoint of the ease of manufacture, a resin sheet or nonwoven fabric having a cloth-like structure is suitably used.

Charge Storage Member

In order to perform efficiently the redox reaction of the electrochromic dyes contained in the display medium 12, as shown in FIG. 1, it is desirable to arrange a charge storage member 33 on the color-forming layer 20 side of the electrode 32. As the charge storage member 33, a member having a specific surface area of $1,000 \text{ g/m}^2$ or more is selected. As a member having such a large specific surface area, carbon or alumina is exemplified, and specific examples thereof include carbon nanotube and activated carbon having an extremely large number of pores. These members have a large specific surface area, and have a large charge capacity to be stored, and have a polarity on the surface thereof. Accordingly, by arranging the charge storage member 33 on the electrode 32, a redox reaction efficiently takes place, so that the color-forming efficiency and decoloring efficiency of the display medium 12 as a whole may be improved.

Method of Manufacturing Display Medium

The display medium 12 having a constitution as described above, for example, is manufactured by the following manufacturing method. In the following manufacturing method, as shown in FIGS. 2A and 2B, the method of manufacturing the display medium 12 is described with the use of, as a porous body used in the display medium 12 of the present exemplary embodiment of the invention, a porous body 35 formed from a sheet-like aggregate 34 of electroconductive fibers and particles 36 retained by the fibers of the aggregate 34 of fibers.

Figure 3A:
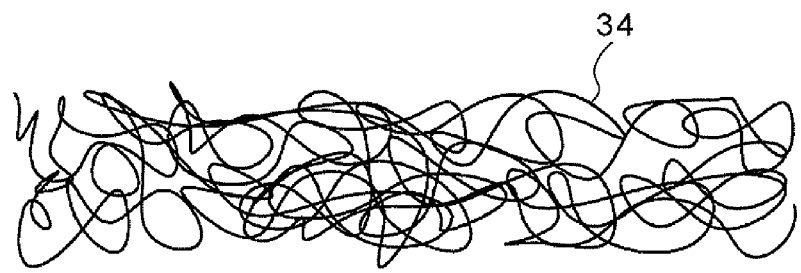
FIGS. 3A to 3C are schematic drawings showing a method of manufacturing a color-forming layer.
Figure 3B:
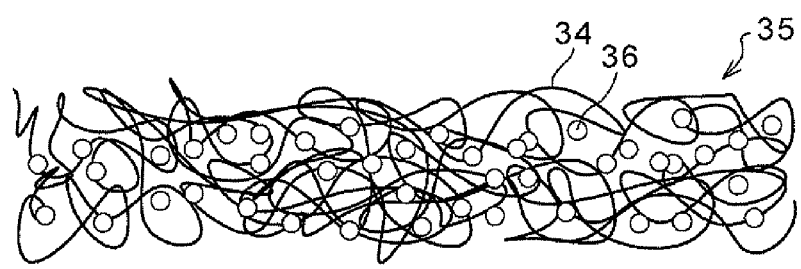

First, the porous body 35 is manufactured. More specifically, first, as shown in FIG. 3A, an aggregate 34 of electroconductive fibers is manufactured. The aggregate 34 of electroconductive fibers is sheet-like. For example, the aggregate 34 of electroconductive fibers can be manufactured in such a manner that a polymer film formed as a fibrous polymer aggregate is prepared, and a film of an electroconductive agent is formed on the surface of each fiber that constitutes the polymer film by the use of a dry process such as the vacuum deposition method or the like, or a wet process such as the spin coating or the like.

Next, particles 36 are retained on the fibers of the sheet-like aggregate 34 of electroconductive fibers (FIG. 38). As the method of retaining the particles 36 on the fibers of the aggregate 34 of fibers, paste formed by dispersing the particles 36 in a solvent is applied on the fibers by a squeegee method or the like and is allowed to permeate gaps among the fibers, and the coated fibers are heated at temperatures such that the fibers are not influenced, so that the solvent is evaporated and the particles 36 are fused onto the fibers, thereby fixing the particles 36 to the fibers.

Figure 3C:
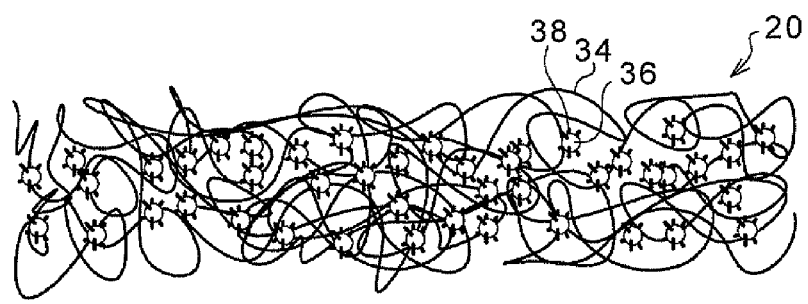
Figure 4A:
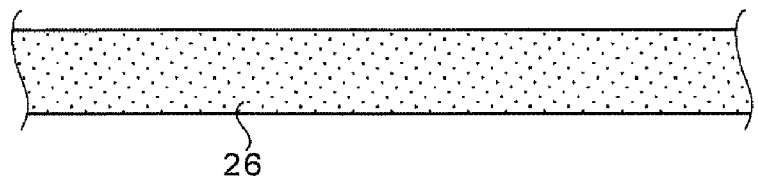
FIGS. 4A to 4D are schematic drawings showing a part of processes of manufacturing a display medium.
Figure 4B:
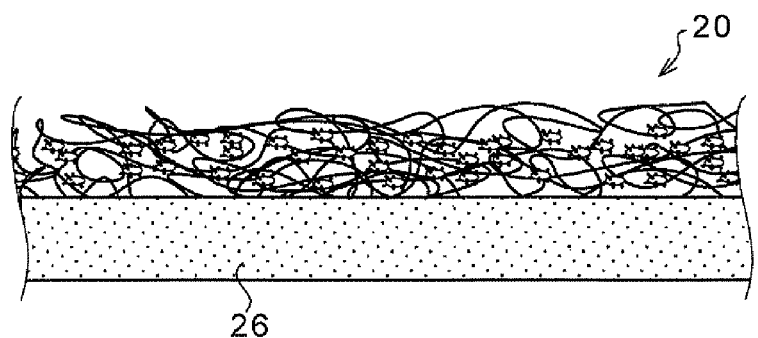
Figure 4C:
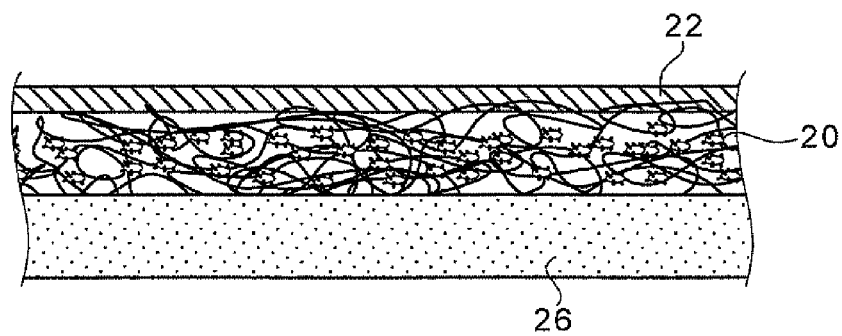
Figure 4D:
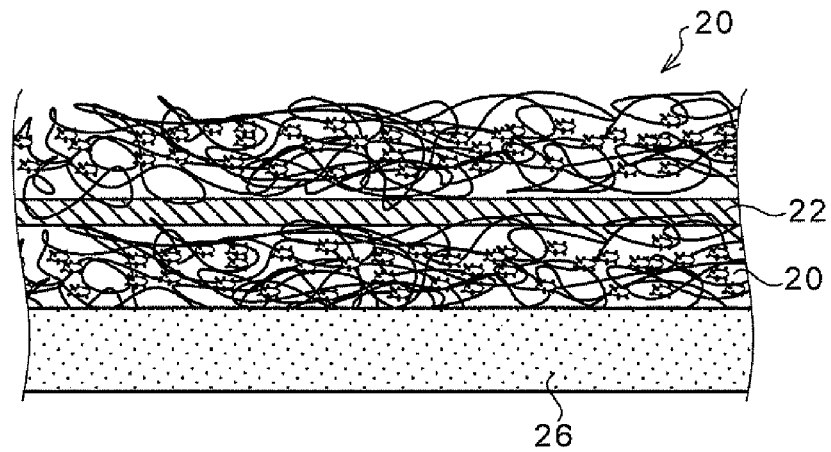

Next, the electrochromic dye 38 is retained on the surface of the particles 36 fixed on the sheet-like aggregate 34 of electroconductive fibers (FIG. 3C). Since the method of retaining the electrochromic dye 38 have already been explained, the explanations thereof are omitted. In this way, the electrochromic dye 38 is retained by the porous body 35 made up of the sheet-like aggregate 34 of electroconductive fibers and the particles 36 retained by the fibers of the aggregate 34, thereby manufacturing a color-forming layer 20.

Here, since the aggregate 34 of electroconductive fibers has a sheet-like form, the manufactured color-forming layer 20 is sheet-like, and can be handled with ease as a single film.

The above process is repeated by changing the kind of the electrochromic dyes, and plural kinds of color-forming layers that retain electrochromic dyes to respectively form different colors can be manufactured.

Next, as shown in FIGS. 4A to 4D, the sheet-like color-forming layer 20 (color-forming layer 20 formed of the porous body 35 in which particles 36 are retained by the sheet-like aggregate 34 of electroconductive fibers, and an electrochromic dye 38 retained by the porous body 35) and a sheet-like insulation layer 22 (for example, insulative nonwoven fabric or resin sheet) prepared separately, are alternatively superimposed on a substrate 26. Further, a reflective layer 24 prepared separately is alternately superimposed thereon (not shown). Then, after an electrolytic material 27 permeates these layers, a substrate 30 having an electrode 32 thereon is superimposed on the layers, thereby manufacturing a display medium 12.

Thus, each color-forming layer 20 can be handled as a single sheet-like member, by the use of the sheet-like aggregate 34 of electroconductive fibers as a porous body included in the color-forming layer 20. On the other hand, when a porous body in a color-forming layer is formed as an aggregate of semiconductive particles as in the conventional manner, the color-forming layer cannot be handled as a sheet-like single member. By using the sheet-like aggregate 34 of electroconductive fibers as a porous body, the manufacturing process of the display medium 12 may be simplified, as compared with the conventional configuration, in which the porous body is formed as an aggregate of particles.

Further, the sheet-like aggregate 34 of electroconductive fibers is used as a porous body included in the color-forming layer 20; as a result, each color-forming layer 20 can be handled as a single sheet-like member. Accordingly, as compared with the conventional configuration in which the porous body is formed as an aggregate of particles, damage of a lower side layer can be prevented at the time of forming an upper side layer, and it is not required to adjust the constituent material or forming conditions at the time of forming of the upper side layer, and therefore, it is thought that the manufacturing process of the display medium 12 can be simplified.

Moreover, in the present exemplary embodiment of the invention, each color-forming layer 20 can be handled as a single sheet-like member, and in the display medium 12 in the present exemplary embodiment of the invention, it is not required to arrange the electrode layers as separate members among the color-forming layers 20. Accordingly, it is not necessary to provide a process for forming an electrode layer by vapor deposition or the like after forming the color-forming layer 20, and it is thought that phenomena such as destruction of the electrochromic dye contained in the color-forming layer 20 due to heat or pressure at the time of forming the electrode layer to be separately prepared do not arise. Further, it is not necessary to take into account the destruction at the time of forming the electrode layer to be separately prepared, and thus, wide choice of the electrochromic dyes used in the color-forming layer 20 can be attained, in comparison with the conventional configuration where an electrode layer is formed separately from the color-forming layer 20.

The display medium 12 in the present exemplary embodiment of the invention can be suitably used in various fields, for example, such as a large-sized display board such as an ECD (electrochromic display) or a stock price display; a light control element such as a glare-resistant mirror or a light-control glass; a low-voltage drive element such as a touch-sensitive panel key switch; an optical switch, an optical memory, an electronic paper and an electronic photo album.

Although the display medium 12 of the present exemplary embodiment of the invention is explained as the display medium 12 including three color-forming layers 20 (color-forming layer 20A, color-forming layer 20B and color-forming layer 20C), the display medium 12 may have any configuration insofar as the display medium 12 is formed of plural color-forming layers 20, and may have two color-forming layers or four or more color-forming layers. When two color-forming layers or four or more color-forming layers are used, it is also not necessary to form electrode layers formed separately from the color-forming layers 20 among the plural color-forming layers 20.

Figure 5:
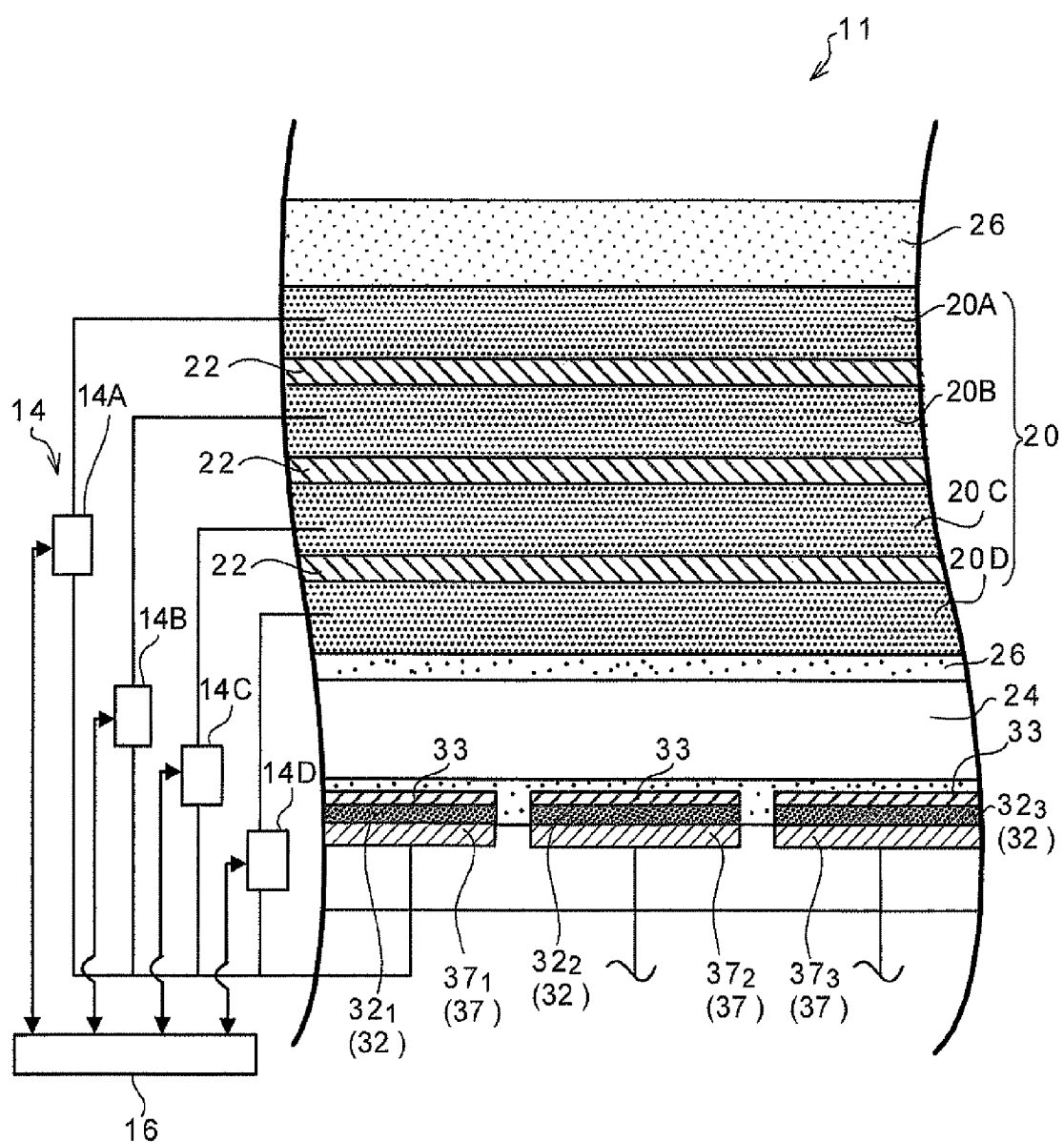
FIG. 5 is a schematic drawing showing a display device according to another exemplary embodiment of the invention.

More specifically, when four color-forming layers 20 are formed, the display 11 may be formed as shown in FIG. 5, and voltage applying section 14 corresponding to the respective color-forming layers 20 may be formed.

The display medium 11 has a substrate 26 and a substrate 30. The electrolytic material 27 is contained in the region between the substrate 26 and substrate 30, and a multilayered structure, in which an electrode 32, a reflective layer 24, a color-forming layer 20D, an insulation layer 22, a color-forming layer 20C, an insulation layer 22, a color-forming layer 20B, an insulation layer 22 and a color-forming layer 20A are superimposed in this order from the substrate 30 side toward the substrate 26 side in the thickness direction of the display medium 12, is formed. Here, the color-forming layer 20D has the same constitution as those of the color-forming layer 20A, the color-forming layer 2013 and the color-forming layer 20C, except that the color-forming layer 20D contains an electrochromic dye that forms a color different from the colors of the color-forming layer 20A, the color-forming layer 20B and the color-forming layer 20C. An electrolytic material 27 is contained in the region between the substrate 26 and the substrate 30.

The voltage applying section 14 includes a voltage applying unit 14A, a voltage applying unit 1413, a voltage applying unit 14C and a voltage applying unit 14D. The voltage applying unit 14A is electrically connected to the electrode 32 and the porous body (illustration is omitted in FIG. 5, but corresponds to the porous body 35 in FIG. 2) contained in the color-forming layer 20A. The voltage applying unit 14B is electrically connected to the electrode 32 and the porous body (illustration is omitted in FIG. 5, but corresponds to the porous body 35 in FIG. 2) contained in the color-forming layer 20B. The voltage applying unit 14C is electrically connected to the electrode 32 and the porous body (illustration is omitted in FIG. 5, but corresponds to the porous body 35 in FIG. 2) contained in the color-forming layer 20C. The voltage applying unit 14D is electrically connected to the electrode 32 and the porous body (illustration is omitted in FIG. 5, but corresponds to the porous body 35 in FIG. 2) contained in the color-forming layer 20D.

In this way, the color-forming layer 20 may be formed in three or more layers (four layers in the example in FIG. 5).

In the display medium 12 and the display medium 11 of the exemplary embodiments of the invention, in order to realize an active-matrix drive, a TFT (thin film transistor) may be formed for each region corresponding to each pixel. More specifically, as illustrated in the display medium 11 as shown in FIG. 5, TFT 37 (including TFT $37_1$ to TFT $37_3$ in FIG. 5) may be formed for each electrode 32 (including electrodes $32_1$ to $32_3$ in FIG. 5) formed in the region corresponding to each pixel.

In the display medium 12 of the exemplary embodiment of the invention, although descriptions are given in the case where the color-forming layer 20A, the color-forming layer 20B and the color-forming layer 20C as plural color-forming layers 20 may respectively form different colors, it is preferable that one of the plural layers 20 be a layer that forms black color.

As described above, three primary colors of yellow, magenta and cyan, and colors by subtractive color mixing of the three primary colors can be displayed on the display medium 12 by selecting an electrochromic dye contained in each color-forming layer of plural color-forming layers 20. Accordingly, when an electrochromic dye that exhibits yellow color is contained in the color-forming layer 20A, an electrochromic dye that exhibits magenta color is contained in the color-forming layer 20B, an electrochromic dye that exhibits cyan color is contained in the color-forming layer 20C, black color by subtractive color mixing of the colored electrochromic dyes can be displayed, by rendering the electrochromic dyes in the color-forming layer 20A, color-forming layer 20B and color-forming layer 20C colored simultaneously.

However, the desired blackness may not be attained in the black display by subtractive color mixing. On the other hand, black color with high degree of blackness may be attained by making any one of plural color-forming layers 20 a color-forming layer 20 that forms black color.

The blackness C* is estimated by the index expressed by formula (1) $C^*=(a^{*2}+b^{*2})\times0.5$ in many cases, and it is assumed that the black becomes the ideal black as C* comes close to zero. In addition, a* and b* indicate the parameters in the CIELAB chromaticity coordinates. The blackness can be obtained in such a manner that L*, a* and b* are measured by the use of X-Rite MODEL938 (trade name: manufactured by X-Rite, Inc.), and C* is calculated in accordance with the formula (1).

When one of plural color-forming layers 20 is used as the layer that forms black color, for example, the color-forming layer 20A, the color-forming layer 20B and the color-forming layer 20C as shown in FIG. 5 are formed to contain the electrochromic dyes that form yellow, magenta and cyan colors, respectively, and the color-forming layer 20D is formed to contain an electrochromic dye that forms black color.

Here, when black color is displayed by the electrolytic deposition of metal, the metal is deposited concomitantly by the application of voltages to render the electrochromic dyes in the other color-forming layers 20 colored or decolored, so that there is a possibility that the control of the display of the desired color becomes difficult. On the other hand, when black color is displayed with the use of an electrochromic dye, the electrolytic deposition of metal is not caused. As an electrochromic dye that forms black color, for example, COLOR FORMER TH-106 and TH-107 (trade names; manufactured by Hodogaya Chemical Co., Ltd.) or the like are exemplified.

As the electrochromic dye that forms black color and is contained in the color-forming layer 20D, a single electrochromic dye that forms black color may be used alone, or three kinds of electrochromic dyes that form cyan, magenta and yellow, respectively, may be mixed in an appropriated compounding ratio, and are used.

Figure 6:
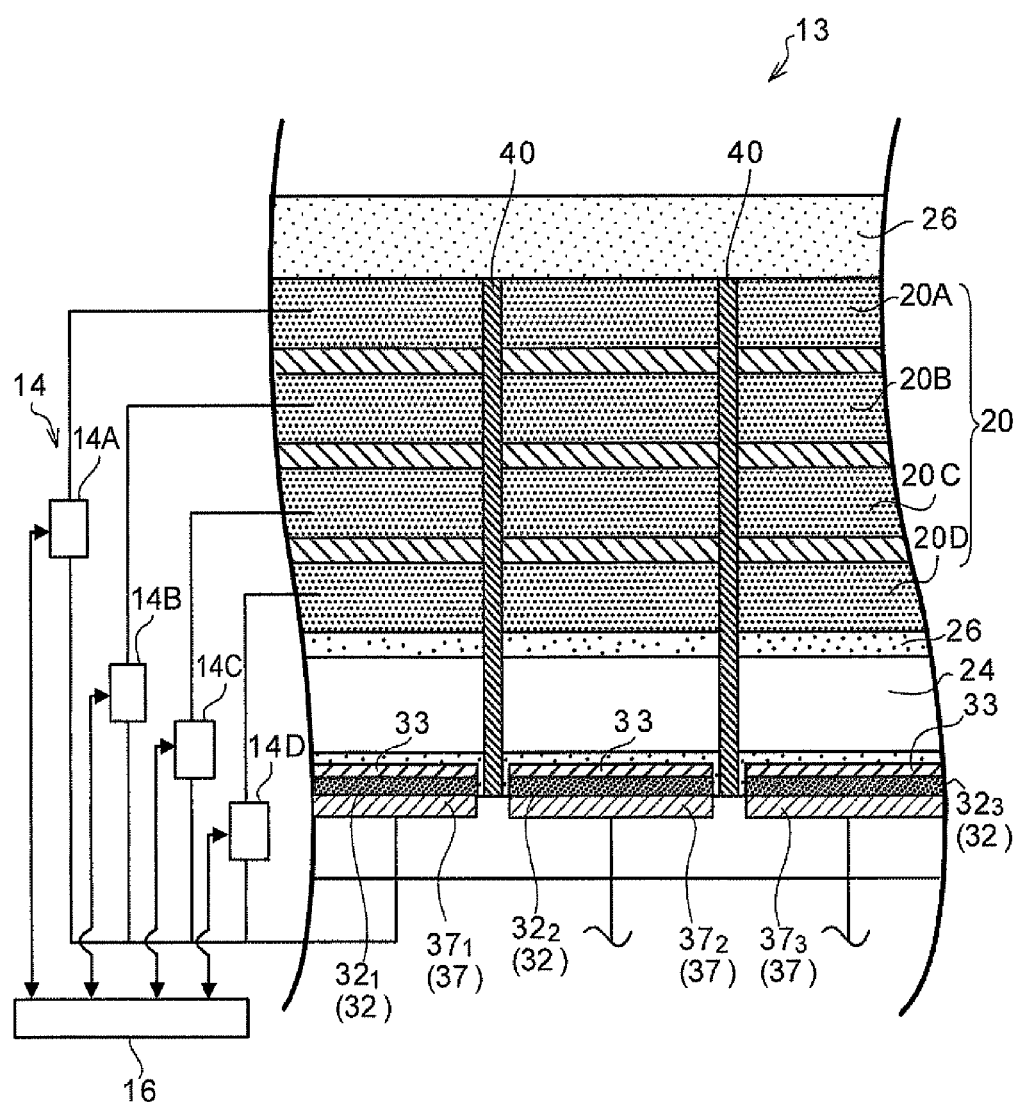
FIG. 6 is a schematic drawing showing a display device according to still another exemplary embodiment of the invention.

In addition, in the present exemplary embodiment of the invention, members for partitioning the region for each pixel between the substrate 26 and the substrate 30 are not arranged in the display medium 12 (refer to FIG. 1), but the display medium may be formed such that members for partitioning the region for each pixel between the substrate 26 and the substrate 30 are arranged. For example, as shown in FIG. 6, in the display medium 11 as shown in FIG. 5, a display medium 13 may be formed such that the region between the substrate 26 and substrate 30 in the display medium 11 is partitioned for each pixel with partitioning members 40. Here, the display medium 13 as shown in FIG. 6 is the same as the display medium 11 as shown in FIG. 5 except that the partitioning members 40 are arranged in the display medium 13, and accordingly, the explanations thereof are omitted. The partitioning members 40 may be any member having insulating property.

In addition, in the present exemplary embodiment of the invention, although descriptions are given in the case where the electrochromic dye is retained by the porous body in the color-forming layer 20, the electrochromic dye may also be dispersed in the electrolytic material 27. In this case, as the electrochromic dye dispersed in the electrolytic material 27, the electrochromic dye that forms a color different from the colors formed by the electrochromic dyes retained by the porous bodies of the plural color-forming layers 20, may be used. In this way, further multicolor display may be realized.

Further, in the present exemplary embodiment of the invention, although descriptions are given in the case where, as shown in FIG. 1, the electrode 32 is arranged only at the substrate 30 side, of the substrate 26 or the substrate 30, an electrode may also be arranged on the surface of the color-forming layer 20 side of the substrate 26. Further, as described above, the electrochromic dye may be dispersed in the electrolytic material 27, and voltages may be applied to this electrode and the electrode 32, so that the electrochromic dye dispersed in the electrolytic material 27 may be colored or decolored. In addition, even if such an electrode is not provided, needless to say, the electrochromic dye dispersed in the electrolytic material 27 can be colored or decolored by applying voltages to the color-forming layer 20 and the electrode 32.

In the present exemplary embodiment of the invention, although descriptions are given in the case where the reflective layer 24 is formed in the display medium 12, the reflective layer 24 may not be formed. Further, in the present exemplary embodiment of the invention, although descriptions are given in the case where the insulation layers 22 are arranged among the color-forming layers 20, the insulation layer 22 may not be arranged between the color-forming layers adjacent to each other, insofar as the electric continuity does not arise between the adjacent color-forming layers 20 due to the direct contact between the adjacent color-forming layers 20. In this case, for example, the edges of each color-forming layer 20 may be fixed to members that maintain the distance between the substrate 26 and the substrate 30 (at the side edges of the display medium 12 (not shown)), to such an extent that the color-forming layers 20 do not come into direct contact with each other.

Display Device

Specifically, the display of a desired image on the display medium 12 of the present exemplary embodiment of the invention may be realized by placing the display medium 12 in the display device 10.

For example, as shown in FIG. 1, a display device 10 is formed of the display medium 12 as described above, a voltage applying section 14 and a control section 16. The voltage applying section 14 is electrically connected to the control section 16.

The voltage applying section 14 includes a voltage applying unit 14A, a voltage applying unit 1413 and a voltage applying unit 14C. The voltage applying unit 14A is electrically connected to the electrode 32 and the porous body (illustration is omitted in FIG. 1, but corresponds to the porous body 35 in FIG. 2) contained in the color-forming layer 20A. The voltage applying unit 14B is electrically connected to the electrode 32 and the porous body (illustration is omitted in FIG. 1, but corresponds to the porous body 35 in FIG. 2) contained in the color-forming layer 20B. The voltage applying unit 14C is electrically connected to the electrode 32 and the porous body (illustration is omitted in FIG. 1, but corresponds to the porous body 35 in FIG. 2) contained in the color-forming layer 20C.

Namely, the voltage applying unit 14A applies voltages to the electrode 32 and the electroconductive porous body of the color-forming layer 20A, the voltage applying unit 1413 applies voltages to the electrode 32 and the electroconductive porous body of the color-forming layer 2013, and the voltage applying unit 14C applies voltages to the electrode 32 and the electroconductive porous body of the color-forming layer 20C.

Here, as described above, in the display medium 12 of the present exemplary embodiment of the invention, an electrolytic material 27 is contained in the region between the substrate 26 and the substrate 30, the electrode 32 is arranged at the substrate 30 side, and plural color-forming layers 20 are superimposed in the thickness direction in the region between the electrode 32 and the substrate 26 via the insulation layers 22. Each of the color-forming layers 20 includes an electroconductive sheet-like porous body and an electrochromic dye retained by the porous body. The electrochromic dyes contained in the respective color-forming layers respectively form different colors.

Accordingly, in order to render the electrochromic dye contained in the color-forming layer 20 colored, the voltage application from the voltage applying unit 14A, the voltage applying unit 14B and the voltage applying unit 14C may be selectively controlled.

For example, of the plural color-forming layers including the color-forming layer 20A, the color-forming layer 20B and the color-forming layers 20C as shown in FIG. 1, when voltages are applied to the electroconductive porous body of the color-forming layer 20B and the electrode 32 from the voltage applying unit 14B according to the control of the control section 16, the electrochromic dye contained in the color-forming layer 2013 changes from a decolored state to a colored state. At this time, when the color-forming layer 20A and the color-forming layers 20C are disconnected and in an electrical floating state, electrons are not given to and received by the color-forming layer 20A and the color-forming layers 20C, so that the colors of the color-forming layer 20A and the color-forming layers 20C are not changed. In this way, each layer of the color-forming layer 20A, the color-forming layer 20B and the color-forming layers 20C can form a color with desired density, independently.

As described above, in the display medium 12 of the present exemplary embodiment of the invention, the electrolytic material 27 is contained in the region between the substrate 26 and the substrate 30, the electrode 32 is arranged at the substrate 30 side, and plural color-forming layers 20 are superimposed in the thickness direction in the region between the electrode 32 and the substrate 26 via the insulation layers 22. Each of the color-forming layers 20 includes an electroconductive sheet-like porous body and an electrochromic dye retained by the porous body, and the electrochromic dyes contained in the respective color-forming layers respectively form different colors. In the display device 10, by applying voltages to the electrode 32 and the electroconductive sheet-like porous body, the electrochromic dyes retained by the porous bodies in the color-forming layers 20 are colored or decolored.

Thus, in the display 10 of the present exemplary embodiment of the invention, voltage is applied to the electroconductive porous body itself in the color-forming layer 20 of the display medium 12, so that electrons are given to and received by the electrochromic dye via the electroconductive porous body. For this reason, as compared with the conventional constitution in which the porous body is formed as an aggregate of particles, and the color-forming layer and the electrode layer are formed separately, defects in display may be suppressed in the invention.

Furthermore, in the configuration where the porous body in the color-forming layer 20 of the display medium 12 is formed from the aggregate of electroconductive fibers and particles retained by the aggregate of the electroconductive fibers, and the electrochromic dye is retained on at least one of the particles and the electroconductive fibers, the contact area between the fibers of the aggregate of electroconductive fibers and the particles retained by the fibers are large, as compared with the contact area between the electrode layer and the particles of a porous body in the conventional configuration where the porous body is formed as an aggregate of particles, and the electrode layers are formed separately from a color-forming layer and are superimposed on the color-forming layer (porous body). Accordingly, the failure in electrical continuity can be suppressed, and electrons are effectively given to and received by the electrochromic dye retained by the porous body, so that defects in display may be suppressed.

When the porous body is formed from the aggregate of electroconductive fibers and electroconductive or semiconductive particles retained by the aggregate of the electroconductive fibers, as described above, the porous body becomes strong against flexure or bending, and even when cracks are formed in the porous body, defects in display may be suppressed since the porous body is always in contact with a part of the aggregate of the electroconductive fibers.

Further, in the manufacturing process, when the porous body is formed from the aggregate of electroconductive fibers and the electroconductive or semiconductive particles retained by the aggregate of the electroconductive fibers, as described above, the destruction of the electrochromic dye may be suppressed, wide choice of electrochromic dyes may be attained, and manufacturing process may be further simplified, as compared with the conventional constitution.

EXAMPLES

Hereinafter, the present invention is explained in more detail with reference to the examples. Various changes of materials, use amounts, rates, particulars of processing, processing procedures and the like may be made without departing from the spirit and the scope of the invention. Accordingly, the scope of the invention is not limited to the following embodiments.

Example 1

First, a display medium is prepared.
Preparation of Substrate

A glass substrate (CORNING 1737 (trade name) manufactured by Corning, Inc.) having a thickness of 1.1 mm with a carbon electrode, and a glass substrate (CORNING 1737 (trade name) manufactured by Corning, Inc.) having a thickness of 1.1 mm with an ITO electrode are prepared as substrates.
Electrolytic Material As an electrolytic solution as an electrolytic material, a solution of 50 mM of tetrabutyl ammonium perchlorate (TRAP)/N-methylpyrrolidone (NMP)/50 mM of ferrocene (redox agent) is used.
Preparation of Color-forming Layer A color-forming layer is prepared. First, a porous body formed from an aggregate of fibers and particles retained by the aggregate of fibers is prepared.
Preparation of Porous Body First, a polyethylene porous sheet (NEOPORE@ (trade name); (thickness of 20 μm; porosity of 72%) manufactured by Teijin, Ltd.) as an aggregate of fibers is prepared, and an electroconductive film is formed as an ITO and IZO mixed film on the surface of the polyethylene fibers that constitute the porous sheet using ITO and IZO as a target by the use of a sputtering device. Thus, an electroconductive porous sheet is prepared. The surface resistivity is about 100 Ω/□.

The porous sheet exhibits pale cream yellow, and is transparent. More specifically, the transmitted light intensity $T_2$ in the visible light wavelength range of the porous sheet impregnated with the electrolytic solution is 75%, when measured by the use of USB 2000 ((trade name) manufactured by Ocean Optics Inc). Meanwhile, the transmitted light intensity of only the electrolytic solution $T_1$ is 95%, when measured by the use of the same apparatus. Thus, when the transmitted light intensity of only the electrolytic solution is set to $T_1$ and the transmitted light intensity in the visible light wavelength range of the porous sheet impregnated with the electrolytic solution is set to $T_2$, the light transmittance (light transmittance=$T_2/T_1 \times 100(\%)$) is 79%, and it is confirmed that the porous sheet prepared is transparent.

Moreover, it is confirmed that when the porous sheet is immersed in the electrolytic solution, the electrolytic solution permeates the inside of the porous sheet. Thus, clogging among the fibers of the porous body does not arise, and it is confirmed that the film-like (sheet-like) porous structure is maintained.
Preparation of Porous Body Particles are retained among the fibers of the porous sheet. More specifically, first, the formed porous sheet is coated with $TiO_2$ paste (HT-LALT (trade name: manufactured by Solaronix SA)) in an appropriate amount by squeegee method, so that the inside of the porous sheet is filled with $TiO_2$ particles. This sheet is heated at 100° C. for 15 minutes in the atmosphere, so that the $TiO_2$ particles are retained by the fibers of the porous sheet. Thus, as a porous body made up of the aggregated of fibers and the particles retained by the fibers, an electroconductive porous sheet, in which the $TiO_2$ particles are retained among the fibers, is prepared.

It is observed that the electroconductive porous sheet, in which the $TiO_2$ particles are retained among fibers, is more transparent in comparison with the porous sheet before the $TiO_2$ paste is coated. It can be assumed that this is because light scattering due to the fibers decreased owing to permeation of the $TiO_2$ particles among the fibers of the electroconductive porous sheet.
Preparation of Color-forming Layer (Porous Sheet 1)

A viologen derivative (reduction dye) represented by the following formula (I) is prepared as an electrochromic dye.

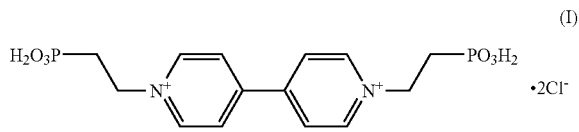

The electroconductive porous sheet, in which the $TiO_2$ particles are retained among fibers, is immersed into a 0.02 M aqueous solution of the viologen derivative for 4 hours, the viologen derivative as an electrochromic dye is adsorbed to the electroconductive porous sheet, in which the $TiO_2$ particles are retained among fibers. The sheet after the adsorption is washed with pure water three times and is washed with ethanol once, and the sheet is then heated and dried at 100° C. for 15 minutes. In this way, an electroconductive porous sheet (hereinafter, referred to as porous sheet 1), in which the $TiO_2$ particles are retained among fibers on which the viologen derivative as an electrochromic dye is adsorbed, is prepared as a color-forming layer.
Preparation of Color-forming Layer (Porous Sheet 2)

Carboxyfluorescein (Ca-Flu) is prepared as an electrochromic dye. The electroconductive porous sheet, in which the $TiO_2$ particles are retained among fibers, is immersed into a 0.02 M aqueous solution of the carboxyfluorescein for 4 hours, the carboxyfluorescein as an electrochromic dye is adsorbed to the electroconductive porous sheet, in which $TiO_2$ particles are retained among fibers. The sheet after the adsorption is washed with pure water three times and is washed with ethanol once, and the sheet is then heated and dried at 100° C. for 15 minutes. In this way, an electroconductive porous sheet (hereinafter, referred to as porous sheet 2), in which the $TiO_2$ particles are retained among fibers on which the carboxyfluorescein as an electrochromic dye is adsorbed, is prepared as a color-forming layer.
Preparation of Reflective Layer As a reflective layer, a polyethylene porous polymer sheet, in which $TiO_2$ particles as a filler are dispersed, is used. The thickness of the sheet itself is 31 μm, and the reflectance is 95.8%.
Preparation of Insulation Layer As an insulation layer, a polyethylene porous sheet (NEOPORE@ (trade name: thickness of 10 μm; manufactured by Teijin, Ltd.) is prepared.
Manufacture of Display Medium.

A spacer with a thickness of 100 μm (TEFLON (registered trademark) sheet) is formed on the periphery of the substrate with the ITO electrode, and on the surface of this substrate (within the area surrounded by the spacer), are superimposed the sheet-like insulation layer, the porous sheet 2 (sheet with carboxyfluorescein as an electrochromic dye), the sheet-like insulation layer, the porous sheet 1 (sheet with viologen derivative as an electrochromic dye), the sheet-like reflective layer and the substrate having carbon electrode in this order.

Next, dimethyl terephthalate (DTP) (reduction dye) represented by the following formula (II) as an electrochromic dye is prepared and is dissolved at a concentration of 50 mM in the electrolytic solution, and the resultant solution is charged between the substrates, thereby manufacturing a display medium 1.

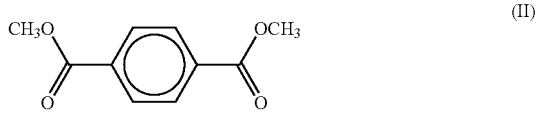

Evaluation of Display Color

Voltages are applied to the ITO electrode, the carbon electrode, the porous sheet 1 and the porous sheet 2 of the display medium 1, and the colored state is observed.

Voltages are applied to the carbon electrode and the electroconductive porous sheet in the porous sheet 2, in which carboxyfluorescein as an electrochromic dye is retained. More specifically, when a voltage of 0 volt is applied to the carbon electrode, whereas a voltage of −4 volts for 10 seconds is applied to the electroconductive porous sheet in the porous sheet 2, yellow color as the color of the colored state of carboxyfluorescein, is observed. Further, defects (portion displayed in white as the color of the reflective layer) in display are not observed in the displayed yellow color.

Next, after the discontinuance of the voltage application, voltages are applied to the carbon electrode and the electroconductive porous sheet in the porous sheet 1, in which the viologen derivative as an electrochromic dye is retained. More specifically, when a voltage of 0 volt is applied to the carbon electrode, whereas a voltage of −2.5 volts for 10 seconds is applied to the electroconductive porous sheet in the porous sheet 1, blue color as the color of the colored state of the viologen derivative, is observed. Further, defects (portion displayed in white) in display are not observed in the displayed blue color.

Further, after the discontinuance of the voltage application, voltages are applied to the carbon electrode and the ITO electrode. More specifically, when a voltage of 0 volt is applied to the carbon electrode, whereas a voltage of −5 volts for 10 seconds is applied to the ITO electrode, and red color as the color of the colored state of the DTP as an electrochromic dye dispersed in the electrolytic material, is observed. Further, defects (portion displayed in white) in display are not observed in the displayed red color.

Furthermore, after the discontinuance of the voltage application, voltages are applied to the carbon electrode and the electroconductive porous sheet in the porous sheet 2, in which carboxyfluorescein as an electrochromic dye is retained, the electroconductive porous sheet in the porous sheet 1, in which the viologen derivative as an electrochromic dye is retained, and the ITO electrode. More specifically, when a voltage of 0 volt is applied to the carbon electrode, whereas a voltage of −4 volts to the electroconductive porous sheet in the porous sheet 2, a voltage of −2.5 volts to the electroconductive porous sheet in the porous sheet 1, and a voltage of −5 to the ITO electrode are applied for 10 seconds, are applied, respectively. As a result, black color is displayed on the display medium 1. It is assumed that this is because color due to subtractive color mixing of colors of all the electrochromic dyes contained in the display medium 1 is displayed. Further, defects (portion displayed in white) in display are not observed in the displayed black color.

When, from the above state, the voltages applied to the carbon electrode, the electroconductive porous sheet in the porous sheet 2 and the electroconductive porous sheet in the porous sheet 1 are changed gradually toward the positive voltage, the changes of colors to green, yellow and white are observed.

When the polarity of the voltages applied to the carbon electrode, the electroconductive porous sheet in the porous sheet 2 and the electroconductive porous sheet in the porous sheet 1 is reversed, white color is displayed.

As described above, it is confirmed that the electrochromic dyes retained by each porous body is colored by selectively applying voltages to the electroconductive porous sheet (namely, the electroconductive porous body in the color-forming layer) and the electrode arranged at the substrate side.

Evaluation of Defects in Display

After the display medium 1 is repeatedly subjected (100 times) to a bending test at an angle of 90°, the voltage application test is performed in the same manner as the voltage application in the evaluation of the displayed color.

As a result, when voltage is applied to the carbon electrode and the electroconductive porous sheet in the porous sheet 1 under the same conditions as the evaluation of displayed color, blue color in the state where the viologen derivative is colored is observed in the display medium 1. Further, defects (portion displayed in white) in display are not observed in the displayed blue color similarly to the displayed color before the 100 times bending test.

Moreover, when voltage is applied to the carbon electrode and the electroconductive porous sheet in the porous sheet 2, in which carboxyfluorescein as an electrochromic dye is retained, under the same conditions as the evaluation of displayed color, yellow color in the state where the carboxyfluorescein is colored is observed in the display medium 1. Further, defects (portion displayed in white) in display are not observed in the displayed yellow color similarly to the displayed color before the bending test 100 times.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display medium comprising:
a pair of substrates;
an electrode arranged between the pair of substrates;
a multilayered structure including plural color-forming layers arranged between one substrate of the pair of substrates and the electrode, each of the plural color-forming layers containing an electroconductive cloth or film-member porous body configured as a single independent member and an electrochromic dye which is retained by the porous body and is reversibly colored or decolored by at least one of an electrochemical oxidation reaction or a reduction reaction, and the colors when the electrochromic dyes in the respective plural color-forming layers are colored being different from one another; and an electrolytic material included in a region between the pair of substrates, wherein the electrolytic material is a liquid or a gel, and permeates the multilayered structure;

the electrolytic material is a solution in which an electrolyte is dissolved in a solvent, or a gel of the solution; and the electrolytic material further contains a redox agent which does not form a color by a redox reaction.

2. The display medium according to claim 1, wherein the porous body comprises an aggregate of electroconductive fibers, and electroconductive or semiconductive particles retained by the aggregate of electroconductive fibers.

3. The display medium according to claim 2, wherein the electrochromic dye is retained at least on the surface of the electroconductive or semiconductive particles.

4. The display medium according to claim 1, wherein the concentration of the electrolyte in the solvent is from about 0.001 mol/l to about 2 mol/l.

5. The display medium according to claim 1, wherein the display medium further comprises at least one insulation layer between the plural color-forming layers.

6. The display medium according to claim 1, wherein the volume resistivity of the porous body is less than about $10^2 \Omega \cdot cm$.

7. The display medium according to claim 1, wherein the thickness of the color-forming layer is from about 1 μm to about 100 μm.

8. The display medium according to claim 1, wherein the specific surface area of the porous body is from about 1 m²/g to about 5,000 m²/g.

9. The display medium according to claim 2, wherein the electroconductive or semiconductive particles comprise a single element semiconductor, an oxide semiconductor, a compound semiconductor, an organic semiconductor, a composite oxide semiconductor or a mixture thereof.

10. The display medium according to claim 2, wherein the multilayered structure comprises at least three color-forming layers arranged between the one substrate of the pair of substrates and the electrode.

11. A display device comprising:

a display medium including a pair of substrates; an electrode arranged between the pair of substrates and on one substrate of the pair of substrates; a multilayered structure including plural color-forming layers arranged between one substrate of the pair of substrates and the electrode; each of the plural color-forming layers containing an electroconductive cloth or film-member porous body configured as a single independent member and an electrochromic dye which is retained by the porous body and is reversibly colored or decolored by at least one of an electrochemical oxidation reaction or an reduction reaction, and the colors when the dyes in the respective plural color-forming layers are colored being different from one another; and an electrolytic material included between the pair of substrates, wherein the electrolytic material is a liquid or a gel, and permeates the multilayered structure;

the electrolytic material is a solution in which an electrolyte is dissolved in a solvent, or a gel of the solution;

the electrolytic material further contains a redox agent which does not form a color by a redox reaction; and a voltage applying device that applies voltages to the electrode and the porous body in the plural color forming layers.

* * * * *